May 15, 1962　　　R. F. CARLSON ET AL　　　3,034,759
AUTOMATIC CONTROL FOR VEHICLE SEAT ADJUSTERS
Filed Sept. 3, 1959　　　　　　　　　　　　　　　4 Sheets-Sheet 1
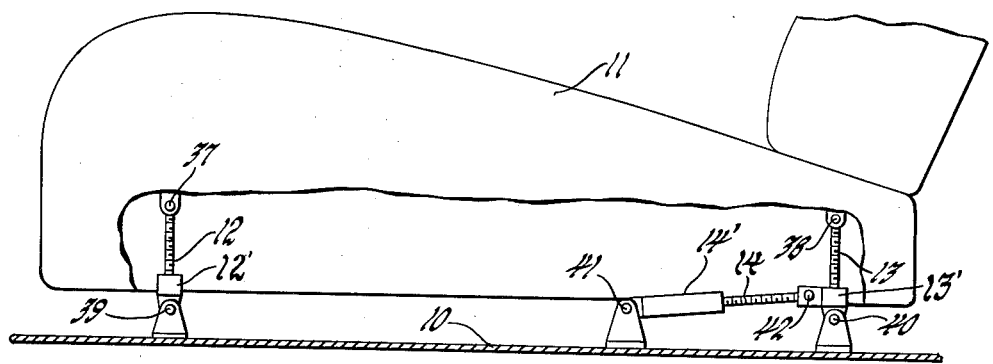
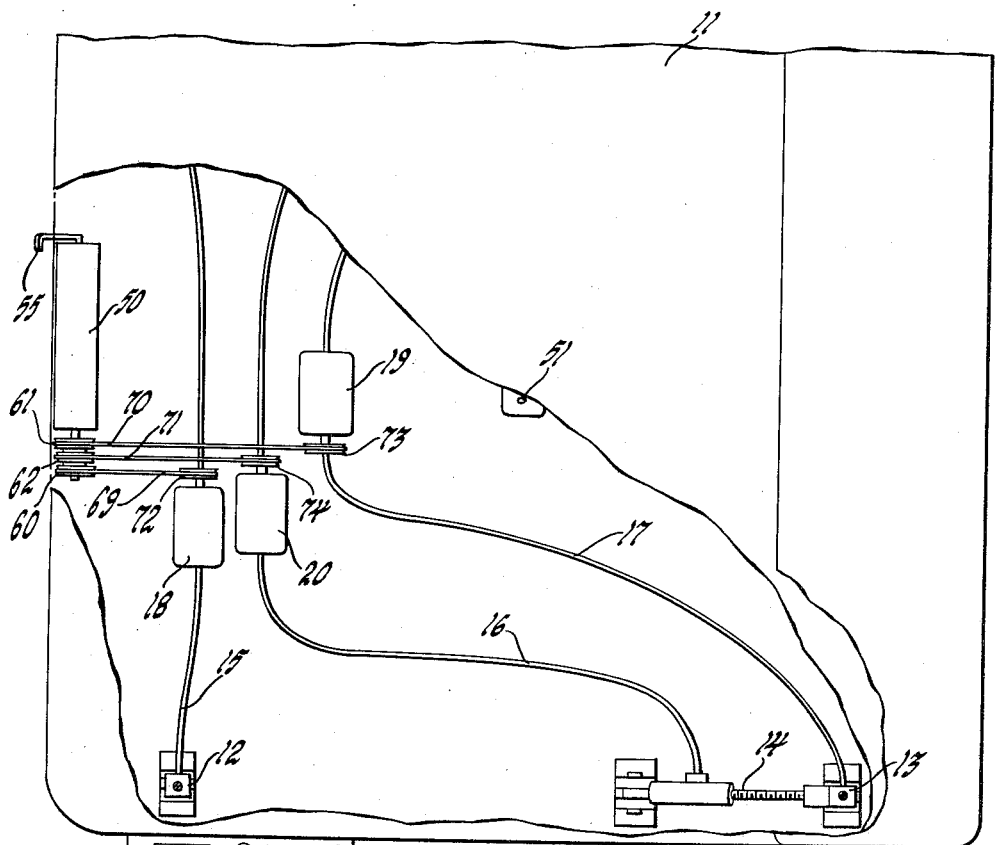
INVENTORS
Ronald F. Carlson,
Robert N. Hockenberger &
BY　John O. McDougal
E. W. Christen
ATTORNEY May 15, 1962 R. F. CARLSON ET AL 3,034,759
AUTOMATIC CONTROL FOR VEHICLE SEAT ADJUSTERS
Filed Sept. 3, 1959 4 Sheets-Sheet 2
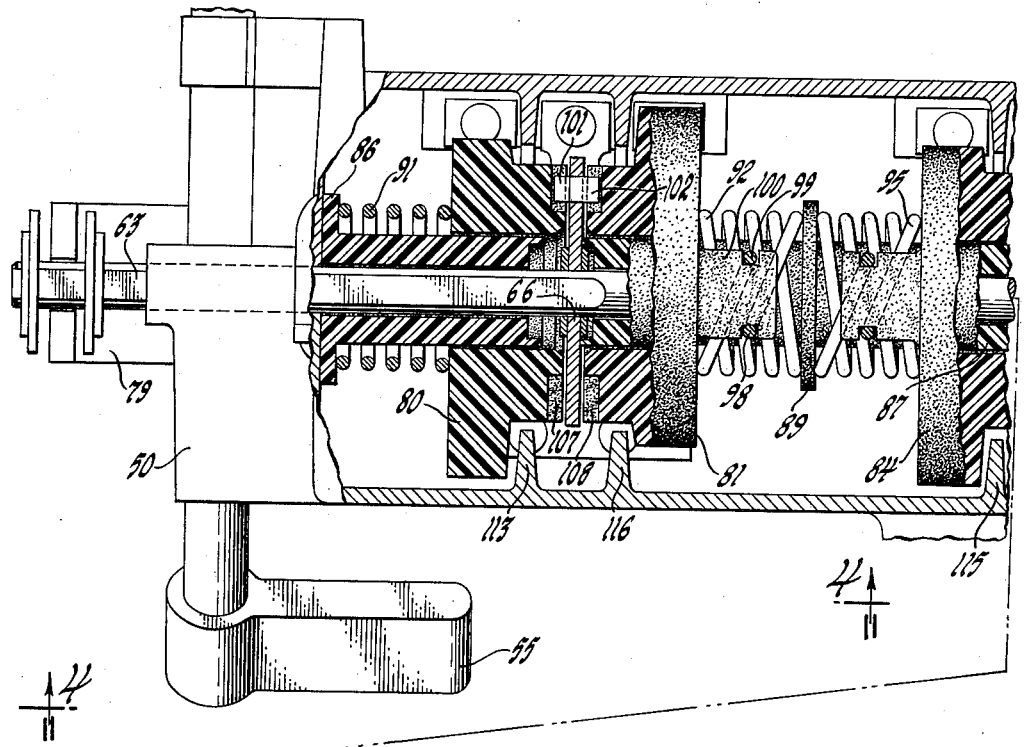
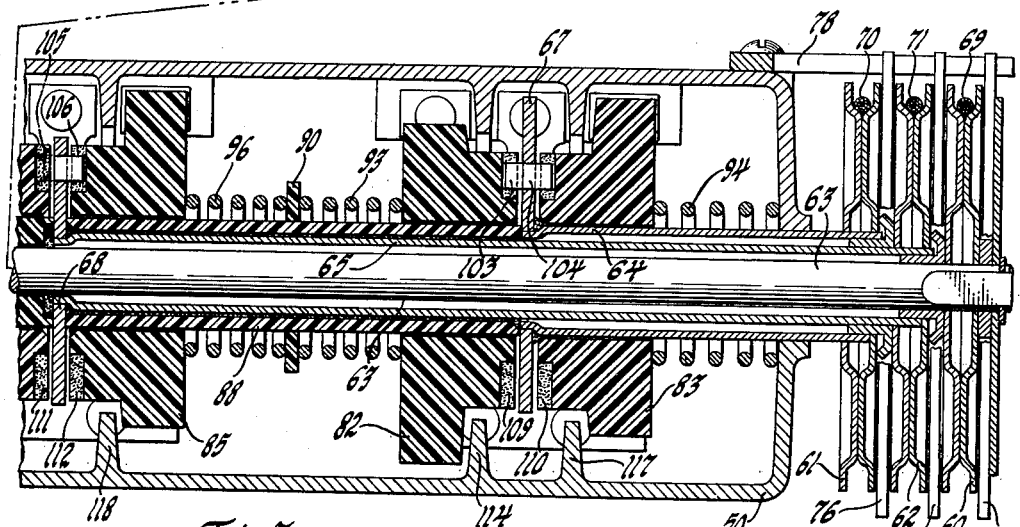
Fig. 3
INVENTORS
Ronald F. Carlson,
Robert H. Hockenberger &
BY John Q. McDougal
E. W. Christen
ATTORNEY

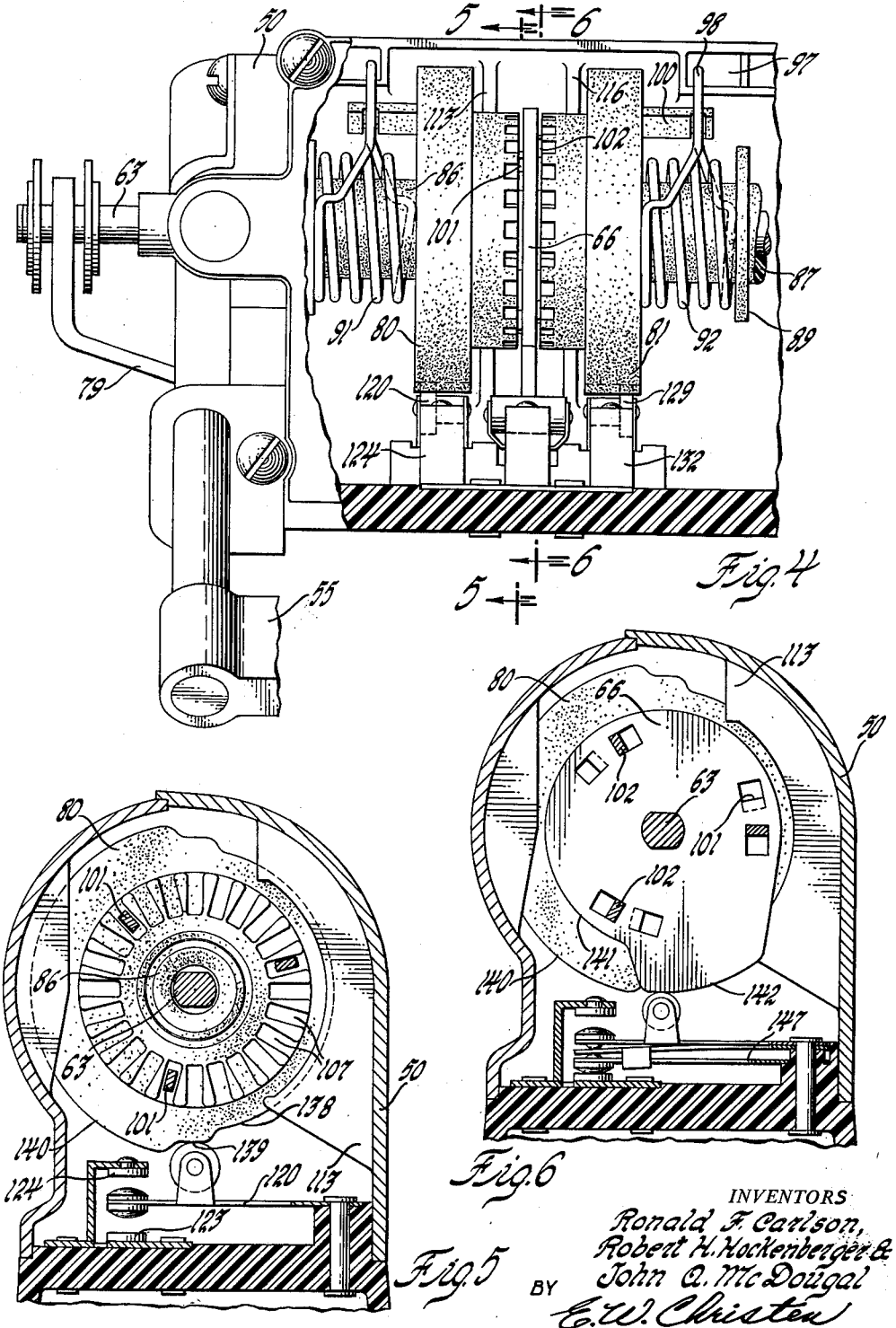

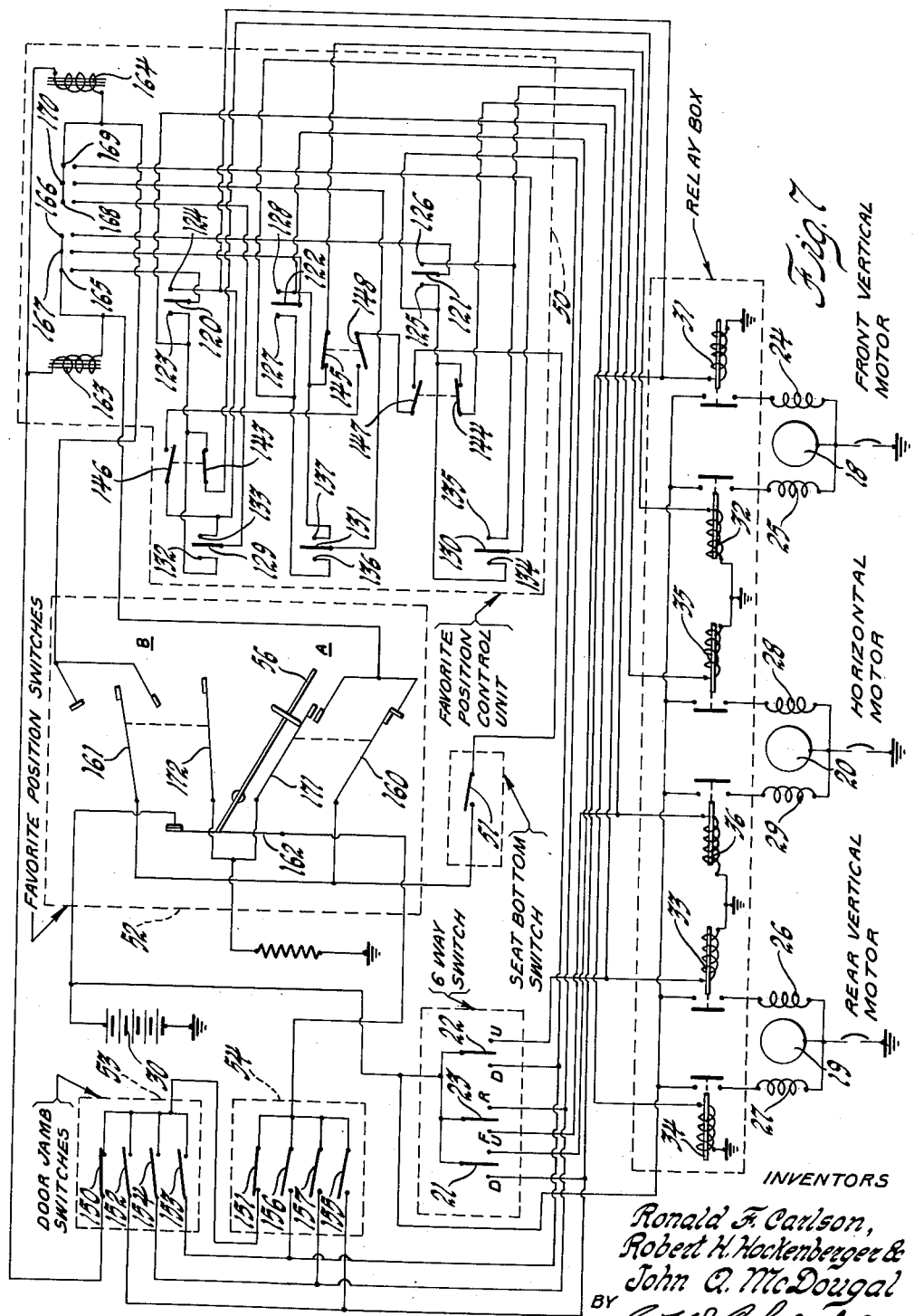

United States Patent Office 3,034,759
Patented May 15, 1962

3,034,759
AUTOMATIC CONTROL FOR VEHICLE
SEAT ADJUSTERS
Ronald F. Carlson, Flint, Mich., Robert H. Hockenberger, Nashotah, Wis., and John A. McDougal, Flint, Mich., assignors to General Motors Corporation, Detroit, Mich., a corporation of Delaware
Filed Sept. 3, 1959, Ser. No. 837,929
8 Claims. (Cl. 248—393)

This invention relates to vehicle seat adjusters of the power operated type and, more particularly, to an automatic control therefor.

The invention facilitates the operation of such seat adjusters by providing an automatic control to undertake adjustments that inconvenience the driver when made under manual control. Most vehicles are commonly used by two drivers who favor different seat adjustment positions, for example, a large driver will usually prefer a downward, rearward and somewhat inclined position while a small driver will usually prefer a higher, forward and more upright position. Considerable manual control is sometimes expended before the driver arrives at his or her favorite position so the loss of such position may be annoying. The invention provides a means whereby two drivers can register their particular favorite position in an automatic control in order that they may then regain such positions by the simple manipulation of a position selector switch. Moreover, the drivers may move to other positions by manipulating manual control switches to reduce fatigue during trips of long duration without disturbing the favorite positions that were registered in the automatic control. The invention also affords an automatic adjustment of the seat in conjunction with the operation of the front doors of the vehicle, the seat being automatically adjusted to a downward and rearward limit position whenever either door is opened to facilitate exits and entrances and being automatically returned to the favorite position when the doors are closed.

In the drawings:

FIGURE 1 is a side elevation, partially broken away, of a vehicle front seat incorporating the invention;

FIGURE 2 is a partially broken away plan view of the seat;

FIGURE 3 is a longitudinal plan view, partially broken away, of the favorite position control unit for the seat;

FIGURE 4 is another partially broken away view of the favorite position control unit taken on the plane indicated by the line 4—4 of FIGURE 3;

FIGURE 5 is a sectional view taken on the plane indicated by the line 5—5 of FIGURE 4;

FIGURE 6 is a sectional view taken on the plane indicated by the line 6—6 of FIGURE 4, and FIGURE 7 is a circuit diagram of the seat adjuster control system.

Referring particularly to FIGURES 1, 2 and 7, the vehicle 10 carries the driver's side of a front seat 11 by means of a front vertical jack 12, a rear vertical jack 13 and a horizontal jack 14. Conventional drive nuts mounted in nut housings 12', 13' and 14' are drivingly associated with the vertical jacks 12, 13 and 14. A similar set of jacks are provided on the passenger's side of the seat and flexible drive shafts 15—17 connect the jacks 12—14 to reversible drive electric motors 18—20. The motors 18—20 may be operated simultaneously or independently and in either direction by manipulating manual control switches 21—23. The motors 18—20 have field windings 24—29 which provide drive in either direction when energized from a battery 30 by means of the manual control switches 21—23 and motor relay switches 31—36. The vertical jacks 12 and 13 have their upper ends pivoted to the seat at 37 and 38 and their lower ends pivoted to the floor at 39 and 40 while the horizontal jack 14 has its forward end pivoted to the floor at 41 and its rearward end pivoted to the jack 13 at 42. The retraction or extension of the jack 14 thus swings the vertical jacks 12 and 13 about their lower pivots 39 and 40 to provide horizontal movement of the seat.

The arrangement thus far is conventional and provides the driver with the usual manual control of seat position. By manipulating the front vertical manual switch 21 to the up or down position, the driver operates the front vertical motor relays 31 or 32 to extend or retract the jack 12 and thus raise or lower the front portion of the seat 11. By manipulating the rear vertical manual switch 22 to the up or down position, the driver energizes the rear vertical motor relays 33 or 34 to extend or retract the jack 13 and thus raise or lower the rear portion of the seat. By manipulating the horizontal manual switch 23 to the rearward or forward position, the driver energizes the horizontal motor relays 35 or 36 to extend or retract the jack 14 to move the seat rearward or forward.

The automatic control system of the invention includes a favorite position control unit 50 and a seat bottom switch 51 which are located under the driver's side of the seat, a favorite position switch unit 52 which may be located on the instrument panel of the vehicle or at the driver's side of the seat, as shown, and right and left door jamb switch units 53 and 54 which operate through engagement with the door edge as the door is opened or closed. The detailed mechanism and circuitry of the automatic control system is somewhat complex and a general review of the overall operation at this time will aid in understanding the specific details to be described later.

When the driver is seated and the doors are closed, the automatic control system is in condition for the driver to register favorite positions A and B into the control unit 50. The driver obtains a favorite position A by manipulating the manual control switches 21—23 and then moves a handle 55 of the control unit 50 up momentarily from a neutral position to register such favorite position. The favorite position A may thereafter be obtained by merely moving a favorite position selector switch 56 to the A position. The favorite position B is similarly obtained and then registered in the control unit 50 by momentarily moving the handle 55 down from the neutral position. The driver may move the favorite position selector switch 56 to the neutral position and then move the seat from the favorite position by operating the manual control switches 21—23. The driver can thereafter return to the favorite position at any time by merely moving the selector switch 56 to the A or B position. The driver may also establish different favorite positions by momentarily moving the handle 55 up or down from the neutral position.

When either door is opened with the selector switch 56 in the A or B position, one of the door jamb switch units 53 or 54 is operated to automatically adjust the seat to the downward and rearward limit position to facilitate exits. If the driver exits and closes the doors, the seat bottom switch 51 is opened and the seat remains in the downward and rearward limit position to facilitate the driver's entry. When the driver is again seated and the doors are closed, the seat will automatically return to the A or B position.

Referring additionally to FIGURES 3 to 6, the control unit 50 has pulleys 60—62 which are fixed to concentric shafts 63—65 that have secured thereto limit cam and clutch disks 66—68. The pulleys 60—62 are connected by cables 69—71 to pulleys 72—74 which are secured to the flexible drive shafts 15—17 so that the limit disk 66 will rotate in clockwise and counterclockwise directions with downward and upward movements of the front portion of the seat, the limit disk 67 in clockwise and counterclockwise directions with downward and upward movements of the rear portion of the seat and the limit disk 68 in clockwise and counterclockwise directions with rearward and forward movements of the seat. Spiral springs 75—77 have their inner ends secured to the pulleys 60—62 and their outer ends slidably fastened on a bracket 78 to maintain tension in the cables 69—71. The limit disk shafts 63—65 are independently rotatable but shift together in axial direction when the limit disk shaft 63 is shifted axially by means of a lever 79 that is moved when the handle 55 is moved up or down to register a favorite position.

The shafts 63—65 also support favorite position cam and clutch disks 80—85, spacer bushings 86—88 and spacer washers 89 and 90. The position disks 80—85 are rotatable and axially shiftable with respect to the shafts and bushings. Centering springs 91—96 encircle the shafts and bushings and engage the side faces of the position disks 80—85 to keep the position disks and limit disks in a neutral axial position. Referring particularly to FIGURES 3 and 4, the control unit housing has an inwardly projecting stop surface 97 which is slidably engaged on one side by one end 98 of the spring 92 and on the other side by the other end 99 of the spring. A tab 100 projects axially from the position disk 81 and is gripped between the spring ends 98 and 99. The application of a rotative force to the position disk 81 in either direction will wind up the centering spring 92 in the corresponding direction and the spring will return the position disk to the initial or neutral position when the rotative force is removed. The other centering springs 91, 93—96 are similarly secured to the control unit housing 50 and position disks 80, 82—85.

The limit disks 66—68 have their sides provided with axially projecting clutch teeth 101—106 which engage radial serrations 107—112 in the sides of the position disks 80—85. With the handle 55 in the neutral position, the centering springs 91—96 maintain the position disks 80—85 in clutched engagement with the limit disks 66—68 and the position disks accordingly follow the various movements of the seat. When the handle 55 is rotated to shift the shafts 63—65 and limit disks 66—68 to the right, the position disks 81, 83 and 85 are likewise shifted to the right against the springs 92—96 and without change in rotative position because of the continued clutching engagement between the teeth 102, 104 and 106 and serrations 108, 110 and 112. During this movement of the handle 55, the position disks 80, 82 and 84 engage housing shoulders 113—115 which restrain these disks from shifting to the right and thereby disengage the clutch teeth 101, 103 and 105 from the serrations 107, 109 and 111 of the limit disks 66—68. On disengagement of the position disks 80, 82 and 84 from the limit disks 66—68, the centering springs 91, 93 and 95 rotate the position disks to a neutral rotational position as depicted in FIGURE 5 and thereby establish a reference for the favorite position A. The A position is locked into the automatic control when the handle 55 is returned to the neutral position as the limit disks 66—68 are thus shifted leftward to again clutch the position disks 80, 82 and 84.

The favorite position B may be established in a similar manner by moving the handle 55 from the neutral position to shift the limit disks 66—68 to the left whereby the position disks 81, 83 and 85 engage housing shoulders 116—118 and are thus declutched from the limit disks so that the centering springs 92, 94 and 96 will turn the position disks to a neutral rotational position. When the handle 55 is returned to the neutral position, the position disks 81, 83 and 85 are again clutched to the limit disks 66—68 to lock the B position in the automatic control.

Referring additionally to FIGURE 7, the A position disks 80, 82 and 84 operate spring biased switches 120— 122 between contacts 123—128 and the B position disks 81, 83 and 85 operate spring biased switches 129—131 between contacts 132—137 by means of tri-level cam surfaces. The position disks are similar and FIGURE 5 illustrates the tri-level cam surface of position disk 80 which includes radially stepped portions 138—140. The position switches 120—122 and 129—131 are placed in the neutral position by the respective cam portions 139 and in contact engagement by the respective cam portions 138 or 140. The limit disks 66—68 are similar and have bi-level cam surfaces as illustrated in FIGURE 6 which include radially stepped portions 141 and 142. The respective cam portions 142 of the limit disks 66—68 open spring biased switches 143—145 and close spring biased switches 146—148 when the seat is in the downward and rearward limit position. Movement of the seat away from the limit position allows the switches 143—148 to ride on the respective cam portions 141, the switches 143—145 thus being closed and the switches 146—148 thus being opened.

The door jamb switch units 53 and 54 include spring biased switches 150 and 151 which open and close with the door and spring biased switches 152—157 which open with door closure and close with door opening.

The favorite position switch unit 52 includes the five position manual selector switch 56 which closes the A position switch 160 when moved to the A position and which closes the B position switch 161 when moved to the B position. The manual selector switch 56 opens an automatic control cutoff switch 162 when moved to the neutral position. The control unit also includes an A position relay switch 163 and a B position relay switch 164 that close contacts 165—170 when energized. The A position relay 163 is initially energized through a switch 171 which is momentarily closed when the manual selector switch 56 is depressed slightly beyond the normal A position and is thereafter energized through the switch 160 when the manual selector switch 56 is left in the A position. The B position relay 164 is initially energized through a switch 172 which is momentarily closed when the manual selector switch 56 is depressed slightly beyond the normal B position and is thereafter energized through the switch 161 when the manual selector switch 56 is left in the B position.

*Operation*

For manual operation the driver places the favorite position selector switch 56 in the neutral position and moves the manual control switches 21—23 to establish a desired position. The manual switch 21 establishes a direct circuit to the motor relay 31 to move the front portion of the seat upward and establishes a circuit to the motor relay 32 through the limit switch 143 to move the front portion of the seat downward, the limit switch 143 being open only at the full downward position. The manual switch 22 establishes a direct circuit to the motor relay 33 to move the rear portion of the seat upward and establishes a circuit to the motor relay 34 through the limit switch 144 to move the rear portion of the seat downward, the limit switch 144 being open only at the full downward position. The manual switch 23 establishes a direct circuit to the motor relay 36 to move the seat forward and establishes a circuit to the motor relay 35 through the limit switch 145 to move the seat rearward, the limit switch 145 being open only at the full rearward position.

Should the driver desire to establish a favorite position A or B, he need only adjust the seat through operation of the manual switches and then move the handle 55 up or down momentarily. With a favorite position A established, the driver may operate the manual switches to place the seat in some other position and may return at will from such other position to the A position by merely moving the selector switch 56 to the A position. When the selector switch 56 is moved to the A position, the switch 171 is momentarily closed to energize the A position relay 163 from the battery 30 by way of the door jamb switches 150 and 151 and the automatic control switch 162. Once the A position relay 163 is energized, the contacts 165—167 are closed thus establishing circuits to the motor relays 31—36 by way of the A position switches 120—122 which open when the seat is in the A position.

If a door is opened when the seat is in the A position, the A position relay 163 is de-energized by the opening of the door jamb switches 150 or 151. Such door opening causes closure of the door jamb switches 152—153 or 156—157 to energize the motor relays 32, 34 and 35 to move the seat to the downward and rearward limit position. Assuming that the left door was opened, the circuit from the battery 30 to the motor relay 32 is by way of the automatic control cutoff switch 162, the door jamb switch 155 and the limit switch 143 which opens at the limit position, the circuit from the battery 30 to the motor relay 34 is through the automatic control cutoff switch 162, the door jamb switch 156 and the limit switch 144 which opens at the limit position, and the circuit from the battery 30 to the motor relay 35 is through the automatic control cutoff switch 162, the door jamb switch 157 and the limit switch 145 which opens at the limit position.

If the driver leaves the vehicle and closes the door, the seat will remain in the limit position as the A position relay 163 is de-energized. When the driver again enters the vehicle, he closes the spring biased seat bottom switch 51 and when the doors are closed, the A position relay 163 is initially energized by way of the battery 30, automatic control switch 162, door jamb switches 151 and 150, A position switch 160, seat bottom switch 51, limit switches 147, 148 and 146 and the coil of the motor relay 31. The A position switches 120—122 are then effective to energize the various motor relay switches to return the seat to the A position. The automatic control operates in a similar fashion with reference to the B position as is readily seen from FIGURE 7.

While the embodiment of the invention here described is preferred, it should be obvious that other embodiments may be made within the teachings and scope of the invention.

We claim:

1. An automatic control unit for the motor means of a position adjuster mechanism that provides selective adjustment in the positioning of a vehicle seat comprising a housing, a limit position indicating member mounted in the housing for rotational movement in accordance with the positioning of the seat and having a clutch portion, a favorite position indicating member rotatably mounted in the housing adjacent the limit position member and having a clutch portion, a control for axially shifting the clutch portion of one member into and out of clutching engagement with the clutch portion of the other member, and torsion-type spring means engageably arranged with the housing and favorite position member so as to rotatably bias the favorite position member to a neutral rotational position when it is out of clutching engagement with the limit position member.

2. An automatic control unit for the motor means of a position adjuster mechanism that provides selective adjustment in the positioning of a vehicle seat comprising a housing, a limit position indicating member mounted in the housing for rotational movement in accordance with the positioning of the seat and having clutch and cam portions, a limit position indicating switch arranged in the housing for operation by the cam portion of the limit position member, a favorite position indicating member rotatably mounted in the housing adjacent the limit position member and having clutch and cam portions, a favorite position indicating switch arranged in the housing for operation by the cam portion of the favorite position member, a manually operable control for axially shifting the clutch portion of one member into and out of clutching engagement with the clutch portion of the other member, and torsion-type spring means engageably arranged with the housing and favorite position member so as to rotatably bias the favorite position member to a neutral rotational position when it is out of clutching engagement with the limit position member.

3. An automatic control unit for the motor means of a position adjuster mechanism that provides selective adjustment in the positioning of a vehicle seat comprising a housing, a manually operable control, a limit position indicating member mounted in the housing for rotational movement in accordance with the positioning of the seat and for axial movement in accordance with the positioning of the manually operable control and having a clutch portion, a favorite position indicating member rotatably and axially mounted in the housing adjacent the limit position member and having a clutch portion, spring means engageably arranged with the housing and favorite position member so as to bias the favorite position member to a neutral rotational position and to a neutral axial position which provides clutching engagement with the limit position member, a stop surface in the housing engageable with the favorite position member to limit its axial movement in clutch engagement direction, the manually operable control serving to declutch the favorite position member from the limit position member to enable the spring means to turn the favorite position member to the neutral rotational position and thus change its rotational relation with the limit position member.

4. An automatic control unit for the motor means of a position adjuster mechanism that provides selective adjustment in the positioning of a vehicle seat comprising a housing, a manually operable control, a limit position indicating member mounted in the housing for rotational movement in accordance with the positioning of the seat and for axial movement in accordance with the positioning of the manually operable control and having a cam portion and a clutch portion, a favorite position indicating member rotatably and axially mounted in the housing adjacent the limit position member and having a cam portion and a clutch portion, spring means engageably arranged with the housing and favorite position member so as to bias the favorite position member to a neutral rotational position and to a neutral axial position which provides clutching engagement with the limit position member, a stop surface in the housing engageable with the favorite position member to limit its axial movement in clutch engagement direction, a limit position indicating switch arranged in the housing for operation by the cam portion of the limit position member, and a favorite position indicating switch arranged in the housing for operation by the cam portion of the favorite position member, the manually operable control serving to declutch the favorite position member from the limit position member to enable the spring means to turn the favorite position member to the neutral rotational position and thus change its rotational relation with the limit position member.

5. An automatic control unit for the motor means of a position adjuster mechanism that provides selective adjustments in horizontally positioning a vehicle seat and in vertically positioning the front and rear portions thereof comprising a housing, a first limit position indicating member mounted in the housing and rotatable in accordance with the vertical positioning of the front portion of the seat, a second limit position indicating member mounted in the housing and rotatable in accordance with the vertical positioning of the rear portion of the seat, a third limit position indicating member mounted in the housing and rotatable in accordance with the horizontal positioning of the seat, each limit position member having a clutch portion, first, second and third favorite position indicating members rotatably mounted in the housing and each having a clutch portion, a manually operable control for axially shifting the limit position members into and out of clutching engagement with the favorite position members, and first, second and third spring means engageably arranged with the housing and the respective favorite position members so as to bias them to a neutral rotational position when they are out of clutching engagement.

6. An automatic control unit for the motor means of a position adjuster mechanism that provides selective adjustments in horizontally positioning a vehicle seat and in vertically positioning the front and rear portions thereof comprising a housing, first, second and third shafts concentrically mounted in the housing and each having a limit position indicating disk secured thereto, the limit position disks being in axially spaced relation and each having cam and clutch portions, the first shaft and limit position disk being rotatable in accordance with the vertical positioning of the front portion of the seat, the second shaft and limit position disk being rotatable in accordance with the vertical positioning of the rear portion of the seat, the third shaft and limit position disk being rotatable in accordance with the horizontal positioning of the seat, first, second and third favorite position indicating disks individually rotatable and axially shiftable on the shafts and having cam portions and including clutch portions arranged for axial engagement with the respective limit position disk clutch portions, first, second and third pairs of centering springs encircling the shafts and engageably arranged with the housing and the respective favorite position disks so as to bias the respective favorite position disks to neutral rotational positions, and a manually operable control means for axially shifting the shafts and limit position disks as a unit to clutch and declutch the limit position disks and the favorite position disks, the centering springs being effective to change the rotational relation between the declutched disks.

7. An automatic control unit for the motor means of a position adjuster mechanism that provides selective adjustments in horizontally positioning a vehicle seat and in vertically positioning the front and rear portions thereof comprising a housing, first, second and third shafts concentrically mounted in the housing and each having a limit position indicating disk secured thereto, the limit position disks being in axially spaced relation and each having a pair of side face clutch portions, the first shaft and limit position disk being rotatable in accordance with the vertical positioning of the front portion of the seat, the second shaft and limit position disk being rotatable in accordance with the vertical positioning of the rear portion of the seat, the third shaft and limit position disk being rotatable in accordance with the horizontal positioning of the seat, first second and third pairs of favorite position indicating disks individually rotatable and axially shiftable on the shafts and having side face clutch portions arranged for axial engagement with the respective limit position disk clutch portions, first, second and third pairs of centering springs encircling the shafts and engageably arranged with the housing and the respective favorite position disks so as to bias the respective favorite position disks to neutral rotational positions and to a neutral axial position which provides clutching engagement with the respective limit position disks, stop surfaces on the housing engageable with the respective favorite position disks to limit their axial movement in clutch engagement direction, and a manually operable control means for axially shifting the shafts and limit position disks as a unit to either side of the neutral axial position to declutch the limit position disks and the favorite position disks and permit the centering springs to change the rotational relation between them.

8. An automatic control unit for the motor means of a position adjuster mechanism that provides selective adjustments in horizontally positioning a vehicle seat and in vertically positioning the front and rear portions thereof comprising a housing, first, second and third shafts concentrically mounted in the housing and each having a limit position indicating disk secured thereto, the limit position disks being in axially spaced relation and each having a peripheral cam portion and a pair of side face clutch portions, the first shaft and limit position disk being rotatable in accordance with the vertical positioning of the front portion of the seat, the second shaft and limit position disk being rotatable in accordance with the vertical positioning of the rear portion of the seat, the third shaft and limit position disk being rotatable in accordance with the horizontal positioning of the seat, first, second and third pairs of favorite position indicating disks individually rotatable and axially shiftable on the shafts and having peripheral cam portions and including side face clutch portions arranged for axial engagement with the respective limit position disk clutch portions, first, second and third pairs of centering springs encircling the shafts and engageably arranged with the housing and the respective favorite position disks so as to bias the respective favorite position disks to neutral rotational positions and to a neutral axial position which provides clutching engagement with the respective limit position disks, stop surfaces on the housing engageable with the respective favorite position disks to limit their axial movement in clutch engagement direction, first, second and third limit position indicating switches arranged in the housing for operation by the cam portions of the respective limit position disks, first, second and third pairs of favorite position indicating switches arranged in the housing for operation by the cam portions of the respective favorite position disks, and a manually operable control means for axially shifting the shafts and limit position disks as a unit to either side of the neutral axial position to declutch the limit position disks and the favorite position disks and permit the centering springs to change the rotational relation between them.

References Cited in the file of this patent

UNITED STATES PATENTS

| | | |
|---|---|---|
| 2,565,334 | Weingarden | Aug. 21, 1951 |
| 2,762,961 | Colby | Sept. 11, 1956 |